(12) United States Patent
Hoshino et al.

(10) Patent No.: US 7,384,575 B2
(45) Date of Patent: Jun. 10, 2008

(54) MANGANESE ACTIVATED ZINC SILICATE PHOSPHOR AND PLASMA DISPLAY PANEL

(75) Inventors: Hideki Hoshino, Kunitachi (JP); Naoko Furusawa, Hino (JP); Hisatake Okada, Tachikawa (JP)

(73) Assignee: Konica Minolta Holdings, Inc. (JP)

( * ) Notice: Subject to any disclaimer, the term of this patent is extended or adjusted under 35 U.S.C. 154(b) by 372 days.

(21) Appl. No.: 11/139,934

(22) Filed: May 27, 2005

(65) Prior Publication Data
US 2005/0269552 A1 Dec. 8, 2005

(30) Foreign Application Priority Data
Jun. 2, 2004 (JP) ............................. 2004-164400

(51) Int. Cl.
*C09K 11/59* (2006.01)
(52) U.S. Cl. .............................. 252/301.6 F; 313/582; 313/584
(58) Field of Classification Search ......... 252/301.6 F; 313/582, 584
See application file for complete search history.

(56) References Cited

U.S. PATENT DOCUMENTS
7,053,551 B2 * 5/2006 Hoshino et al. ............ 313/581

FOREIGN PATENT DOCUMENTS
JP 2003-193650 7/2003

OTHER PUBLICATIONS

Y.C. Kang, M.A. Lim, H.D. Park, and M. Han, Ba2+ Co-doped Zn2SiO4: Mn Phosphor Particles Prepared by Spray Pyrolysis Process, Journal of the Electrochemical Society, 2002, H7-H11, 150, The Electrochemical Society, Inc.

* cited by examiner

*Primary Examiner*—C. Melissa Koslow
(74) *Attorney, Agent, or Firm*—Cantor Colburn LLP

(57) ABSTRACT

A manganese activated zinc silicate phosphor comprising phosphor particles having a crystal lattice distortion factor of 0.01 to 1.0% which exhibits high emission intensity and reduced afterglow time and a PDP utilizing the same which exhibits high white luminance and a high luminance maintaining ratio.

8 Claims, 2 Drawing Sheets

MANGANESE ACTIVATED ZINC SILICATE PHOSPHOR AND PLASMA DISPLAY PANEL

This application is based on Japanese Patent Application No. 2004-164400 filed on Jun. 2, 2004, in Japanese Patent Office, the entire content of which is hereby incorporated by reference.

FIELD OF THE INVENTION

The present invention relates to a manganese activated zinc silicate phosphor and a plasma display panel utilizing the same.

BACKGROUND OF THE INVENTION

A plasma display panel (hereinafter, referred to as a PDP) is provided with two sheets of glass substrates equipped with electrodes and phosphor layers in a plurality of cells which are separated by walls formed between the substrates. When a cell is discharged by applying voltage between electrodes, UV (ultraviolet) rays are generated, which are attributed to a discharge gas sealed in a cell, and the UV rays activate phosphor resulting in emission of visible light. At present, phosphors predominantly utilized for a PDP application include, for example, (Y, Gd) $BO_3$:Eu (red), $Zn_2SiO_4$:Mn (green), $BaMgAl_{10}O_{17}$:Eu (blue) (for example, refer to patent Document 1).

In recent years, required for a PDP display are, for example, a further improvement in luminance and a more smooth moving image of a display. One of the methods to enhance luminance is an improvement of emission intensity of a phosphor. Specifically, since a green phosphor has a high visual sensitivity, it is important to enhance emission intensity of a green phosphor to improve white luminance. On the other hand, successive display of information within a very short time unit is required for providing smooth moving image of a display, however, $Zn_2SiO_4$:Mn (green) has a rather long afterglow, resulting in a problem of causing an after-image and a flicker of an image when the display moves to a next image. Therefore, reduction of afterglow in addition to an improvement of emission intensity is required.

Generally, with respect to zinc silicate phosphors activated with manganese, for example, $Zn_2SiO$:Mn, attempts to control emission time and afterglow time by varying quantity of manganese as an activator have been made.

However, emission intensity and afterglow time are in a trade-off relationship in many cases and there has been a problem of lowering emission intensity when afterglow time is shortened by increasing an amount of a manganese activator.

Further, disclosed have been shortening of afterglow time and enhancement of emission intensity by introducing Ba as an activator in a manganese activated zinc silicate phosphor ($Zn_2SiO_4$:Mn) (for example, refer to Non-patent Document 1).

However, it is not fully satisfactory with respect to emission intensity and a reduction effect of afterglow time even when quantity of activator is controlled and particle size distribution is improvement in the above technique, and further improvement is still required.

Further, a phosphor layer of each color utilized in a PDP is deteriorated by ultraviolet ray irradiation and ion bombardment at discharging, resulting in reduction of luminance with increasing lighting time of the PDP. Particularly, with respect to ion bombardment, employed in many PDPs are a method in which a phosphor is provided on the other substrate so as to oppose to a pair of display electrodes via a discharge space and are excited to emit light by ultraviolet rays generated by plane discharge between the display electrodes, to avoid ion bombardment at the discharge, however, these are still not fully satisfactory and improvement of a life time characteristic has been an important problem to improve characteristics of a PDP.

(Patent Document 1) Japanese Patent Publication Open to Public Inspection (hereafter referred to as JP-A) No. 2003-183650

(Non-patent Document 1) Journal of the Electrochemical Society, 150(1), H7-H11 (2003)

SUMMARY OF THE INVENTION

An object of the present invention is to provide a manganese activated zinc silicate phosphor which exhibits high emission intensity and reduced afterglow time and a PDP utilizing the same which exhibits a high white luminance intensity and a high luminance maintaining ratio.

One of the aspects of the present invention is a manganese activated zinc silicate phosphor comprising phosphor particles having a crystal lattice distortion factor of 0.01 to 1.0%.

DESCRIPTION OF THE PREFERRED EMBODIMENTS

Figure 1:
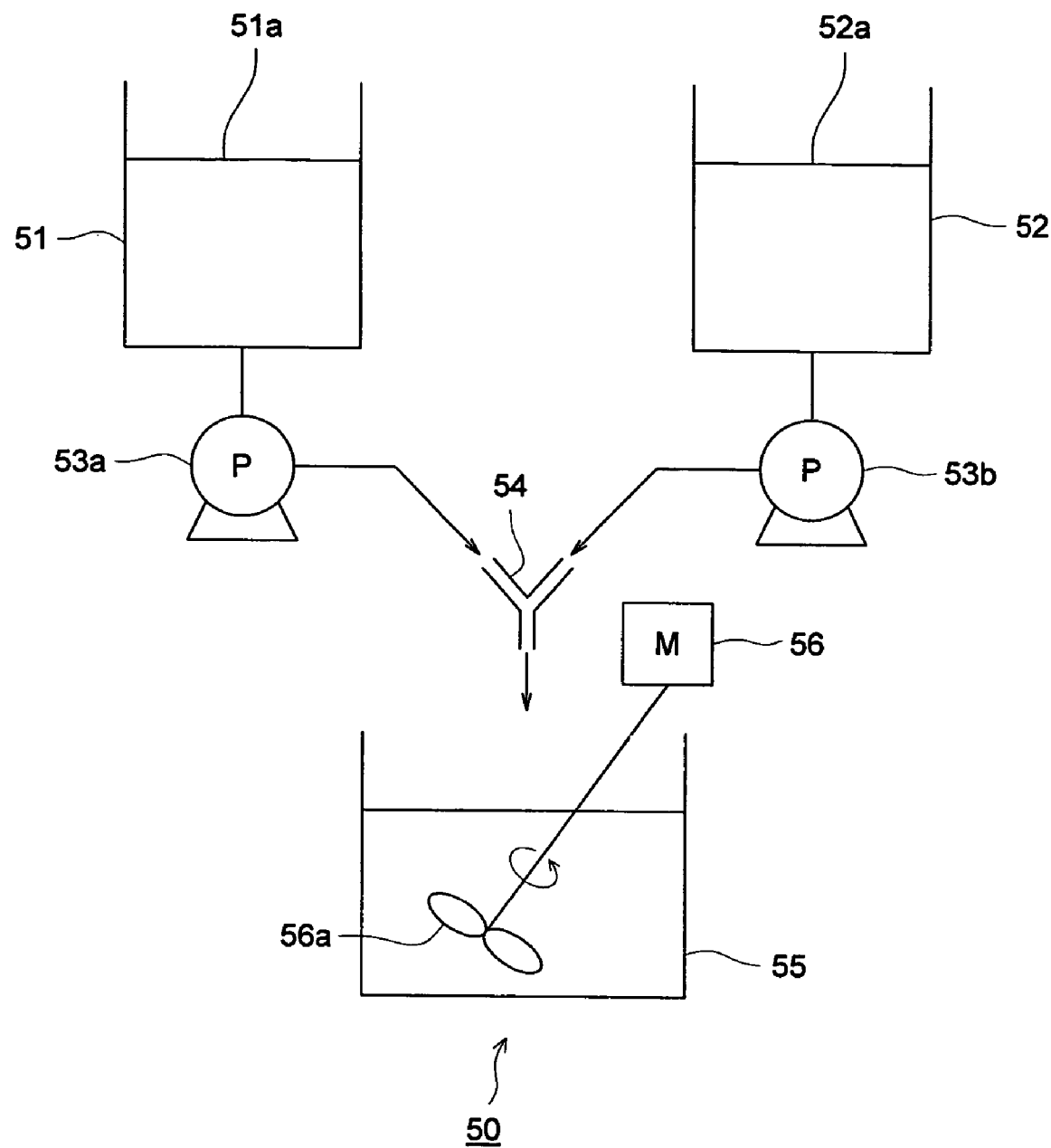
FIG. 1 is a schematic drawing showing an example of a Y-shaped reaction apparatus utilized in the present invention.

The above object of the present invention has been achieved by the following structures.

(1) A manganese activated zinc silicate phosphor comprising phosphor particles having a crystal lattice distortion factor of 0.01 to 1.0%. Herein, the above "phosphor particles" represent the manganese activated zinc silicate phosphor particles.

(2) The manganese activated zinc silicate phosphor of Item (1), wherein the phosphor particles have a crystal lattice distortion factor of 0.02 to 1.0%.

(3) The manganese activated zinc silicate phosphor of Item (1), wherein the phosphor particles have a crystal lattice distortion factor of 0.02 to 0.6%.

(4) The manganese activated zinc silicate phosphor of Item (1), wherein the phosphor particles have a crystal lattice distortion factor of 0.04 to 0.6%.

(5) The manganese activated zinc silicate phosphor of any one of Items (1) to (4), wherein
a content of manganese in the phosphor particles is 2 to 9% by mole based on the total mole of zinc contained in, the phosphor particles; and
the phosphor particles further contain barium and a molar ratio of Ba/Mn in the phosphor particles is 0.005 to 0.2.

(6) The manganese activated zinc silicate phosphor of any one of Items (1) to (4), wherein
a content of manganese in the phosphor particles is 4 to 8% by mole based on the total mole of zinc contained in the phosphor particles; and
the phosphor particles further contain barium and a molar ratio of Ba/Mn in the phosphor particles is 0.02 to 0.1.

(7) The manganese activated zinc silicate phosphor of any one of Items (1) to (6), wherein a number of the phosphor particle having a particle diameter of not more than 2 μm is not less than 70% of the total number of phosphor particles.

(8) A plasma display panel having a phosphor layer containing the manganese activated zinc silicate phosphor of any one of Items (1) to (7).

With respect to the manganese activated zinc silicate phosphor of the present invention, a manganese activated zinc silicate phosphor having excellent characteristics, for example, high emission intensity and shortened afterglow time as well as a PDP which exhibits high white luminance intensity and a high luminance maintaining ratio can be provided, by employing the constitution defined in any one of above Items (1)-(8).

In the following, details of each constituting element according to the present invention will be explained.

<Manganese Activated Zinc Silicate Phosphor>

A manganese activated zinc silicate phosphor of the present invention will now be explained.

<Crystal Lattice Distortion Factor>

A manganese activated zinc silicate phosphor of the present invention is characterized by having a crystal lattice distortion factor of 0.01-1.0%, however, preferably 0.02-1.0%, more preferably 0.02-0.6% and most preferably 0.04-0.6%.

A manganese activated zinc silicate phosphor utilizes Mn as an emission center, and it is considered that emission is generated by releasing a forbidden transition of $Mn^{2+}$ due to a lattice strain caused by replacing a Zn lattice point with Mn having a larger ionic radius (ionic radius of $Zn^{2+}$: 0.074 nm, and ionic radius of $Mn^{2+}$: 0.080 nm).

It was found in the present invention that compatibility of improvement of emission intensity and depression of afterglow time was attained by adjusting a crystal lattice distortion factor of a manganese activated zinc silicate phosphor in a range of 0.01-1.0%. Further, improvement of life time of a PDP was also achieved.

<Measurement of Crystal Lattice Distortion Factor>

Measurements of a crystal lattice distortion factor according to the present invention may be carried out by various methods; however, Hall method has been applied in the present invention. Details of Hall method have been described in Hand Book of X Ray Diffraction, edited by Rigaku Corp., (published by Kokusai Bunken Insatsu Corp., 2000). Specifically, a crystal lattice distortion factor was measured based on the measurement apparatus and measurement conditions described below.

<Measurement Apparatus and Conditions of Crystal Lattice Distortion Factor>

Rotating Anode X-ray Diffraction Apparatus JDX-11RA, manufactured by JEOL was utilized. X-ray was generated at a power of 40 kV-100 mA using a copper target. A divergence slit and a scattering slit of 1° and a receiving slit of 0.1 mm were utilized. In the measurement, scanning was carried out over 2θ=5-70° at a step of 0.002°, and data were accumulated for 0.5 seconds at each step.

Samples were sufficiently grounded in an agate mortar and sealed in a glass sample holder attached to the apparatus to be supplied for measurement. Herein, in Hall method, it is necessary to determine a dispersion of diffraction rays due to the optical system in advance. In the present invention, 4N-silica powder manufactured by KANTO KAGAKU was utilized as a standard sample.

A regression line is determined by means of a minimum square method from the plot of $\beta\cos\theta/\lambda$ versus $\beta\sin\theta/\lambda$ ($\beta$ is a true spread of a diffraction line, $\theta$ is a diffraction angle in degree, $\lambda$ is a wavelength of X-ray) of each diffraction peak according to the procedure described in Handbook of X-ray diffraction, edited by Rigaku-Denki Co. Ltd., based on the diffraction pattern obtained in the above measurement. The inclination of this regression line is a crystal lattice distortion factor 2η (%).

With respect to diffraction peaks to determine a lattice distortion, it is preferable to determine the lattice distortion from not less than three peaks for a plane of the same direction, however, the lattice distortion has been determined from the peaks of (410), (113), (220), (223) and (300), since there were not as many as 3 diffraction peaks for a plane of the same direction in zinc silicate of the present invention.

<Activator Element of Phosphor (Including an Ion)>

A manganese activated zinc silicate phosphor of the present invention is preferably introduced with an activator element other than manganese and utilized as introduced elements are preferably alkaline earth metals (for example Ba, Mg, Ca and Sr).

Any of alkaline earth metals can be preferably utilized; however, barium (hereinafter, referred to as Ba) is specifically preferably utilized.

In the case of utilizing Ba, it is preferable to prepare a manganese activated zinc silicate phosphor by controlling manganese activator quantity to be 2-9 mol % based on zinc quantity and a mol ratio of Ba/Mn of 0.005-0.2. And it is more preferable that manganese activator quantity of 4-8 mol % based on zinc quantity, and a mol ratio of Ba/Mn of 0.03-0.1.

In the following, composition analysis of a manganese activated zinc silicate phosphor of the present invention, qualitative and quantitative analysis of an activator element, and quantitative analysis of a mixing ratio of activator elements in a phosphor will be specifically described.

<Composition Analysis (Qualitative and Quantitative Analysis)>

Quantitative analysis of silicon was performed by an alkali fusion method, and quantitative analysis of elements except for silicon was performed by an Inductively Coupled Plasma Atomic Emission Spectroscopy (also referred to as an ICP) after having been dissolved in hydrofluoric acid.

In an alkali fusion method, 2.5 g of sodium carbonate was added after 0.1 g of each phosphor was weighed in a platinum crucible, and the resulting product was fused in an electric furnace at 1000° C. for 1 hour, which was then added with ultra pure water to be dissolved while being heated. The resulting solution was appropriately filtered insoluble substance was observed in the solution, and the volume was adjusted to 50 ml.

A solution, in which 2.5 g of sodium carbonate only was dissolved, was separately prepared, and a silicon standard original solution (for atomic absorption analysis) manufactured by KANTO KAGAKU was added therein to prepare a standard concentration solution.

For dissolution in hydrofluoric acid, 10 ml of hydrofluoric acid (manufactured by KANTO KAGAKU, ultra high purity) was added after each 0.1 g of a phosphor was weighed in a Teflon (a trade mark) beaker, and the system was evaporated to dryness while being heated. After this operation was repeated twice, the resulting product was added with nitric acid (manufactured by KANTO KAGAKU, ultra high purity) of 10 ml and dissolved to make the volume of 50 ml. This solution was designated as a sample solution.

For qualitative and quantitative analysis of elements, ICP SPS5000 manufactured by Seiko instruments Inc. or ICP QP-Ω manufactured by VG Elemental Co., Ltd. was utilized.

Further, at the time of quantitative analysis, a standard concentration solution, in which a standard original solution manufactured by KANTO KAGAKU and nitric acid (ultra purity, manufactured by KANTO KAGAKU) were added, was separately prepared and a calibration curve method was applied.

<Particle Size Distribution (Phosphor Particle Diameter and Weight % Occupying Whole Phosphor Particles)>

In a manganese activated zinc silicate phosphor of the present invention, it is preferable to adjust phosphor particles having a particle diameter of not more than 2 μm is not less than 70 weight % based on the whole phosphor particles.

By adjusting the particle diameters of the phosphor as described above, a high filling up ratio of the phosphor particles in a phosphor layer of a PDP cell is obtained and as the result, a high luminance and a long life of a PDP were obtained.

Herein, the particle diameter distribution was measured by use of Particle Diameter Distribution Meter (LMS-300, manufactured by Seishin Enterprise Co., Ltd.). Ratio of particles having a particle diameter of not more than 2 μm was determined from the measured particle size distribution based on weight %.

<Manufacturing Method of Manganese Activated Zinc Silicate Phosphor>: Liquid Phase Synthesis Method The manufacturing method of a manganese activated zinc silicate phosphor of the present invention is not specifically limited and conventionally well known methods can be utilized; however, a liquid phase synthesis method is specifically preferable with respect to adjusting a crystal lattice distortion factor within a range of 0.1-1.0%.

In the present invention, a liquid phase synthesis method includes: (i) a precursor forming process in which a precursor of a phosphor is formed by mixing phosphor raw materials in a liquid phase; and (ii) a calcination process in which phosphor is obtained by culminating the obtained precursor. Herein, a precursor is an intermediate compound of a phosphor to be formed into a phosphor by a calcinating treatment, as described above.

In a precursor forming process such as a co-precipitation method, a reaction crystallization method and a sol-gel method are preferably employed; however, a precursor is preferably formed by a co-precipitation method, specifically, by employing a silicon compound such as silicon or silica as mother nuclei of a precursor. A co-precipitation method is a method in which a phosphor precursor is synthesized by employing a co-precipitation phenomenon, in a state of precipitating activator metal elements around mother nuclei of a fluorescent precursor, by mixing a solution containing raw material elements of a phosphor and a precipitant.

Herein, a co-precipitation phenomenon refers to a phenomenon in which precipitation of a chemical species is accompanied by co-precipitation of an ion which has a sufficient solubility in the solution and not necessary to precipitate. In manufacturing of a phosphor, it refers to a phenomenon in which activator metal elements co-precipitate with the phosphor precursor while depositing around a mother nuclei of the phosphor precursor.

The activator elements are preferably added as chlorides or nitrates and preferably existing as cationic ions in the solvent.

Further, solvents utilized for a solution (or may be a dispersed liquid) may be any known solvents, provided that the solvent does not essentially dissolve a silicon-containing material, and the solvents are preferably water, alcohols or mixtures thereof. Examples of an alcohol include: methanol, ethanol, isopropanol, propanol and butanol. Of these, ethanol is specifically preferable.

Wherein, "solvents which do not essentially dissolve a silicon-containing material" mean that a solubility of a silicon-containing material in a solvent is not more than 0.01 weight %.

As a precipitant, an organic acid or an alkali hydroxide is preferably utilized. An organic acid or an alkali hydroxide reacts with a metal element to form an organic acid salt or a hydroxide as a precipitate. At this time, it is preferable that these precipitates are deposited around a siloicon-containing material.

Organic acids are preferably those having a carboxyl group (—COOH), and specific examples include, for example, oxalic acid, formic acid, acetic acid and tartaric acid. Also, applicable are the compounds which generate oxalic acid, formic acid, acetic acid or tartaric acid by hydrolysis.

Alkali hydroxides may be any known compounds having a hydroxyl group (—OH), compounds which generate a hydroxyl group by reacting with water, or compounds which generate a hydroxyl group by hydrolysis, examples of which include: ammonia, sodium hydroxide, potassium hydroxide and urea. Of these, ammonia is preferably utilized and ammonia containing no alkali metals is specifically preferable.

A manufacturing of the manganese activated zinc silicate phosphor of the present invention is carried out by use of a manufacturing apparatus, for example, as shown in FIG. 1 which is a schematic drawing to show an example of a Y-shaped reaction apparatus.

The Y-shaped reaction apparatus 50 shown in FIG. 1 is equipped with reagent solution vessel 51 and reagent solution vessel 52, both of which are connected to form Y-shaped reaction tube 54 via roller pumps 53a and 53b. Herein, a cock to adjust a flow volume (not illustrated) may be provided between roller pumps 53a, 53b and Y-shaped reaction tube 54.

Under aforesaid Y-shaped reaction vessel tube 54, reaction vessel 55, which is equipped with stirring motor 56 and stirring fan 56a, is arranged.

By use of Y-shaped reaction apparatus 50 shown in FIG. 1, a synthesis of a manganese activated zinc silicate phosphor is performed as follows. First, solution A (51a) is prepared in reagent vessel 51, in which a silicon compound and a precipitant is dispersed, and solution B (52b) is prepared in reagent vessel 52, in which a zinc compound and a manganese compound is contained. An alkaline earth metal compound is preferably contained in solution B.

Next, solution A and solution B are mixed and reacted in Y-shaped reaction vessel 54, followed by further reacting in reaction vessel 55 while stirring to complete the reaction, resulting in preparation of a phosphor precursor.

A manganese activated zinc silicate phosphor of the present invention can be obtained by calcinating the prepared phosphor precursor as described later in examples.

<Plasma Display (PDP)>

A plasma display panel according to the present invention will now be explained referring to FIG. 2. Herein, a PDP includes a CD type, in which direct current voltage is applied, and an AC type, in which an alternate current voltage is applied, when being briefly classified based on a structure and a operating mode of an electrode, however, FIG. 2 illustrates an example of a brief constitution of an AC type PDP.

Figure 2:
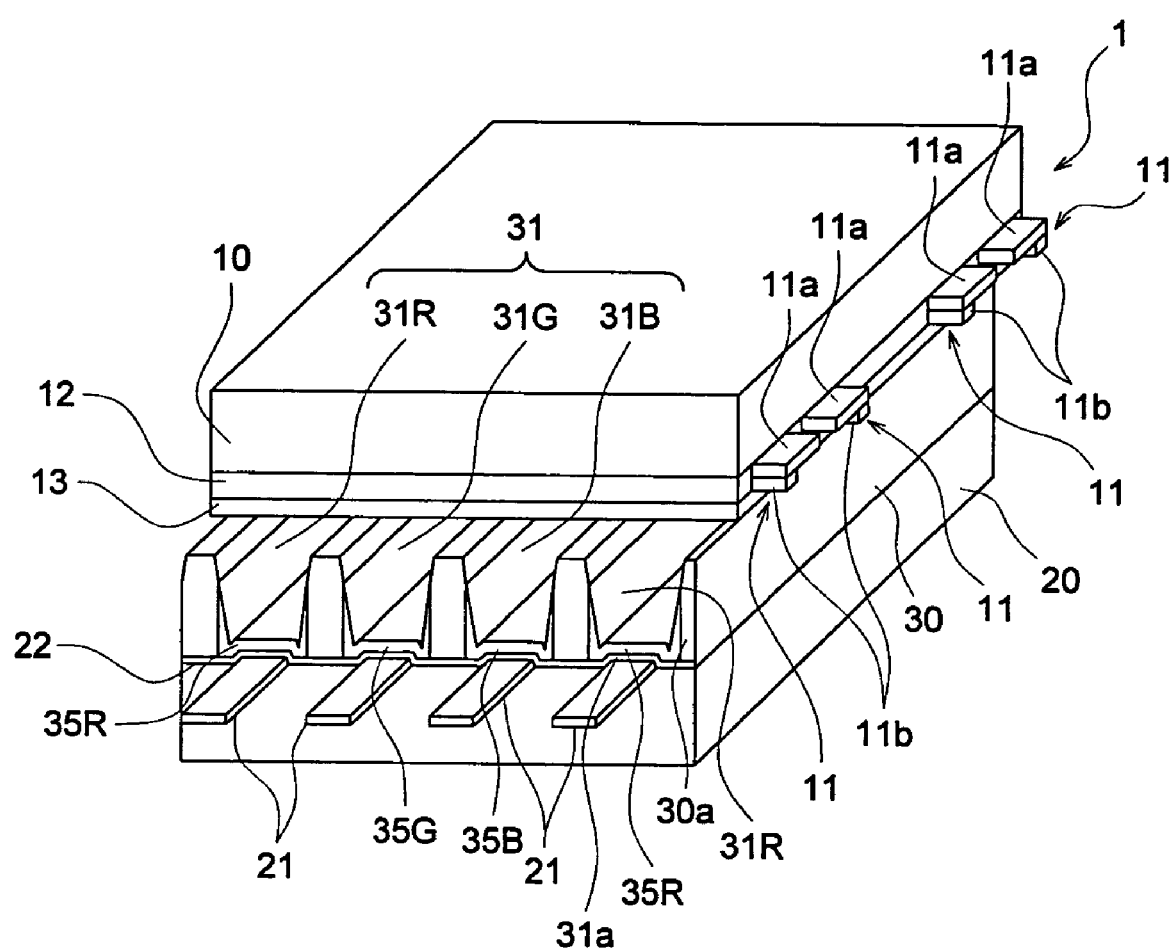
FIG. 2 is a schematic drawing illustrating an example of a PDP of the present invention.

The PDP shown in FIG. 2 is provided with two sheets of substrates 10 and 20 equipped with electrodes 11 and 21, separating wall 30 provided between these substrates 10 and 20, and a plurality of minute discharge spaces 31 which are divided into predetermined shape by separating wall 30. Discharge cells 31 shown in FIG. 2 are referred to as a stripe type in which separating walls are arranged in parallel (that is, in a stripe shape) at each predetermined interval when substrates 10 and 20 are horizontally arranged. In each of discharge cells 31R, 31G and 31B, phosphor layer 35R, 35G or 35B containing a phosphor, which performs any one of red (R), green (G) or blue (B) emission, is installed.

In the following, each constitution element of a plasma display panel (PDP) according to the present invention will be explained.

First, of the two substrates, a constitution of the side of front surface plate 10 which is arranged at the display side will be explained. Front surface plate 10 transmits visible light, which is emitted from discharge cell 31, and displays variety of information on a substrate, resulting in functioning as a display image plane of a PDP.

As front surface plate 10, materials to transmit visible light for example soda lime glass (blue plate glass) is preferably utilized. Thickness of front surface plate 10 is preferably in a range of 1-8 mm and further preferably 2 mm. For example display electrode 11, dielectric substance layer 12 and protective layer 13 are provided on front surface plate 10.

A plurality of electrodes 11 are provided on the surface of front surface plate 10, opposing to back surface plate 20, and regularly arranged. Display electrode 11 includes transparent electrode 11a and bus electrode 11b and is provided with a structure in which bus electrode 11b formed as a band form is accumulated on transparent electrode 11a formed as a wide width band form. Herein, the width of bus electrode 11b is formed narrower than that of transparent electrode 11a. Further, display electrode 11 is arranged so as to cross with the aforesaid separating wall 30 at a right angle in a plane view. Herein, two display electrodes 11, which are arranged to oppose each other placing a space of a predetermined interval, constitute one pair. Visible light can be generated from phosphor layers 35R, 35G and 35B by performing plasma discharge between this one pair of display electrodes 11 and 11.

As transparent electrode 11a, a transparent electrode for example a tin oxide film can be utilized and the sheet resistance is preferably not more than 100 Ω/sq. The width of transparent electrode 11a is preferably in a range of 10-200 μm.

Bus electrode 11b is for decreasing the resistance and can be formed by for example sputtering of Cr/Cu/Cr. The width of bus electrode 11b is preferably in a range of 5-50 μm.

Dielectric substance layer 12 covers the whole surface of front surface plate 10, where display electrodes 11 are provided. Dielectric substance layer 12 is formed by dielectric substance for example low melting point glass. The thickness of dielectric substance layer 12 is preferably in a range of 20-30 μm. The surface of dielectric substance layer 12 is totally covered with protective layer 13. As protective layer 13, a MgO film is utilized. The thickness of protective layer 13 is preferably in a range of 0.5-50 μm.

Next, constitution of another substrate, back surface plate 20 will be explained.

Back surface plate 20 is equipped with address electrode 21, dielectric substance layer 22, separating wall 30 and phosphor layers 35R, 35G and 35B.

As back surface plate 20, similar to front surface plate 10, soda lime glass (blue plate glass) is utilized. The thickness of back surface plate 20 is preferably in a range of 1-8 mm and more preferably approximately 2 mm. A plurality of address electrodes 21 are provided on the surface of back surface plate 20 opposing to front surface plate 10. Address electrode 21 is also formed as a band form similar to transparent electrode 11a and bus electrode 11b. A plurality of address electrodes 21 are provided at each predetermined interval so as to cross display electrode 11 at a right angle in a plane view. As address electrode 21, a metal electrode for example an Ag thick film electrode is utilized. The width of address electrode 21 is preferably in a range of 100-200 μm.

Dielectric substance layer 22 covers the whole surface where address electrode 21 is arranged of back surface plate 20. This dielectric substance layer 22 is formed of a dielectric substance for example low melting point glass. The thickness of dielectric substance layer 22 is preferably in a range of 20-30 μm. Separating wall 30 is provided so as to protrude toward the side of front surface plate 10 from the side of back surface plate 20. Separating wall 30 is formed as a long stripe and provided on the both sides of address electrode 21 to form discharge cell 31 of a stripe form in a plane view as described above. Separating wall 30 can be formed of a dielectric substance for example low melting point glass. The width of separating wall 30 is preferably in a range of 10-500 μm and more preferably approximately 100 μm. The height (thickness) of separating wall 30 is generally in a range of 10-100 μm and preferably approximately 50 μm. In each discharge cell 31, one of phosphor layer 35R, 35G or 35B is provided in a regular order which emits each color as described above.

Phosphor layer 35G which exhibits green emission is preferably constituted of zinc silicate phosphor of the present invention represented by aforesaid formula (1) and more preferably of phosphor represented by $Zn_{(2-X-Y)}SiO_4:Mn_X, Mg_Y$.

Phosphors used for phosphor layers 35R and 35B which provide red and blue emission, respectively, are not specifically limited, however, as a phosphor used for phosphor layer 35R, for example, a phosphor containing components represented by $(Y, Gd)BO_3:Eu$ is preferably utilized.

Further, as a phosphor utilized in phosphor layer 35B which provides blue emission, for example, those having a composition formula represented by $BaMgAl_{10}O_{17}:Eu$, is preferably utilized. Further, the thickness of each phosphor layer 35R, 35G and 35B is not specifically limited, however, is preferably in a range of 5-50 μm.

In the process of forming phosphor layer 35G, a zinc silicate phosphor manufactured as above was dispersed in a mixture of for example a binder, a solvent and a dispersant, and thus prepared fluorescent paste, viscosity of which is suitably adjusted, is coated on or filled in discharge cell 31, followed by being dried or burned to form phosphor layer 35G in which a zinc silicate phosphor is adhered on the side surface of separating wall 30 and bottom surface 30a. The content of a zinc silicate phosphor in a fluorescent paste is preferably in a range of 30-60 weight %.

Binders suitable to disperse zinc silicate phosphor particles include ethyl cellulose or polyethylene oxide (a polymer of ethylene oxide), and ethyl cellulose having an ethoxy group (—$OC_2H_5$) of which content is 49-54% is specifically preferable. Further, it is possible to utilize photosensitive resin as a binder. The content of a binder is preferably in a range of 0.15-10% by weight. In order to adjust the shape of phosphor paste which is coated between separating walls 30, the binder content is preferably set higher provided that the viscosity of the paste is not too high.

As a solvent, a mixture of organic solvents having a hydroxyl group (a —OH group) is preferably utilized. Specific examples of such organic solvents include: triphenol ($C_{10}H_{18}O$), butyl carbitol acetate, pentanediol (2,2,4-trimethylpentanediol monoisobutyrate), dipentene (Dipentene, or Limonen) and butyl carbitol. Mixed solvents of these organic solvents are excellent to dissolve a binder described above and to attain superior dispersibility of a phosphor paste.

To improve dispersion stability of phosphor particles in a phosphor paste, a surfactant as a dispersant is preferably added. The content of the surfactant in a phosphor paste is preferably 0.05-0.3 weigh % with respect to obtaining effects to improve dispersion stability or to neutralize electricity, which will be described later. As surfactants, (a) an anionic surfactant, (b) a cationic surfactant and (c) a nonionic surfactant may be utilized. Specific examples include the following:

(a) Anionic surfactants, for example, a fatty acid salt, an alkyl sulfate, an ester salt, an alkylbenzene sulfonate, an alkylsulfo succinate and a naphthalenesulfonate polycarbonate polymer.

(b) Catonic surfactants, for example, an alkylamine salt, a quarternary ammonium salt, an alkyl betaine and an amine oxide.

(c) Nonionic surfactants, for example, a polyoxyethylene alkylether, a polyoxyethylene derivative, a sorbitan fatty acid eser, a glycerin fatty acid ester and a polyoxyethylene alkylamine. An antistatic agent is preferably added to a phosphor paste. Also, many of the surfactants listed above have an effect to prevent electrostatic charge of a phosphor paste and work as antistatic agents. However, the antistatic effect is different depending on the type of a phosphor, a binder or a solvent, accordingly, it is preferable to select a suitable one after testing various surfactants or neutralizing agents.

As an antistatic agent, microparticles of a conductive material is also applicable besides surfactants. Examples of conductive microparticles include carbon microparticles exemplified by carbon black; graphite microparticles; microparticles of metals, for example, Al, Fe, Mg, Si, Cu, Sn and Ag; and microparticles containing metal oxides of the above metal elements. The amount of such conductive microparticles is preferably in a range of 0.05-1.0 weight % based on a weight of a phosphor paste.

By adding an antistatic agent into a phosphor paste, the following improvements are attained and uniform formation of a phosphor layer in each cell becomes possible: (i) prevention of inferior formation of a phosphor layer, for example a rise of a phosphor layer at a break of an address electrode at the central part of a panel, and (ii) prevention of unevenness in the amount of phosphor paste or in the adhesion state of the phosphor paste at a groove of electrodes, in each cell.

Even when a surfactant or carbon microparticles is used as an antistatic agent, these materials may not affect the driving of a PDP (an emission property), since these materials are lost by evaporation or burning out in the phosphor calcination process in which the solvent and the binder contained in the phosphor paste are also removed.

To disperse a zinc silicate phosphor into the above various mixtures, utilized are, for example, (i) a homogenizer of a high speed stirring impeller type; (ii) homogenizers in which a medium is moved to perform microparticles formation by both of collision (crush) and share, for example a colloidal mill, a roller mill, a ball mill, a vibration ball mill, an atliter, a planetary ball mill and a sand mill; (iii) dry type homogenizers, for example, a cutter mill, a hammer mill and a jet mill; (iv) an ultrasonic homogenizer; and (v) a high pressure homogenizer.

When a phosphor paste prepared in the above manner is coated on or filled in discharge cells 31, various methods, for example, a screen printing method, a photoresist film method and an inkjet method are applicable. An inkjet method is specifically preferable because it is possible to easily, precisely and uniformly coat or fill between separating walls 30 at low cost, even when a pitch of separating walls 30 is narrow and discharge cells 31 are finely formed.

These displays such as a PDP of the present invention are capable of improving luminance and smoothly displaying moving images, by utilizing a green phosphor of the present invention. Particularly, since emission intensity of a green phosphor of which visible sensitivity is high, is improved as well as afterglow time is shortened, it is possible to enhance white luminance and prevent an after-image and a flicker of an image due to an afterglow.

EXAMPLES

In the following, the present invention will be explained according to examples, however, the present invention is not limited thereto.

Example 1

<Preparation of Manganese Activated Zinc Silicate Phosphors 1-1 through 1-10 >: Green Phosphor Each of manganese activated zinc silicate phosphors 1-1 through 1-10 was prepared in the following manner.

(Preparation of Manganese Activated Zinc Silicate Phosphor 1-1)

755 g of colloidal silica (PL-3, manufactured by Fuso Chemical Co., Ltd.) and 735 g of ammonia water (28%) were mixed with pure water and the volume was adjusted to 5000 ml to prepare Solution A. Simultaneously, 1613 g of zinc nitrate hexahydrate (manufactured by KANTO KAGAKU, purity of 99.0%), 180 g of manganese nitrate hexahydrate (manufactured by KANTO KAGAKU, purity of 98.0%) and 0.55 g of barium nitrate (manufactured by KANTO KAGAKU, purity of 99.0%) were mixed with pure water and the volume was adjusted to 5000 ml to prepare Solution B.

Solution A and Solution B, after kept at 40° C., were supplied to the Y-shaped reaction apparatus shown in FIG. 1 at an addition rate of 1800 ml/min by use of a roller pump. The precipitate obtained was diluted with pure water and filtered by pressure filtration to be subjected to solid-liquid separation. Successively the product was dried at 100° C. for 12 hours to obtain a dried precursor.

Next, the obtained precursor was calcinated in an atmosphere of 100% nitrogen at 1250° C. for 10 hours to form manganese activated zinc silicate phosphor 1-1.

(Preparation of Manganese Activated Zinc Silicate Phosphor 1-2)

Manganese activated zinc silicate phosphor 1-2 was prepared in the same manner as the preparation of manganese activated zinc silicate phosphor 1-1, except that Solution B was prepared by using 1625 g of zinc nitrate hexahydrate, 23 g of manganese nitrate hexahydrate and 0.18 g of barium nitrate.

(Preparation of Manganese Activated Zinc Silicate Phosphor 1-3)

Manganese activated zinc silicate phosphor 1-3 was prepared in the same manner as the preparation of manganese activated zinc silicate phosphor 1-1, except that Solution A was prepared by using 75 g of colloidal silica and 707 g of ammonia water (28%), and Solution B was prepared by using 1415 g of zinc nitrate hexahydrate, 133 g of manganese nitrate hexahydrate and 2.36 g of barium nitrate.

(Preparation of Manganese Activated Zinc Silicate Phosphor 1-4)

Manganese activated zinc silicate phosphor 1-4 was prepared in the same manner as the preparation of manganese activated zinc silicate phosphor 1-1, except that Solution B was prepared by using 1625 g of zinc nitrate hexahydrate, 177 g of manganese nitrate hexahydrate and 2.40 g of barium nitrate.

(Preparation of Manganese Activated Zinc Silicate Phosphor 1-5)

Manganese activated zinc silicate phosphor 1-5 was prepared in the same manner as the preparation of manganese activated zinc silicate phosphor 1-1, except that Solution B was prepared by using 1597 g of zinc nitrate hexahydrate, 59 g of manganese nitrate hexahydrate and 3.64 g of barium nitrate.

(Preparation of Manganese Activated Zinc Silicate Phosphor 1-6)

Manganese activated zinc silicate phosphor 1-6 was prepared in the same manner as the preparation of manganese activated zinc silicate phosphor 1-1, except that Solution B was prepared by using 1415 g of zinc nitrate hexahydrate, 74 g of manganese nitrate hexahydrate and 1.25 g of barium nitrate.

(Preparation of Manganese Activated Zinc Silicate Phosphor 1-7)

Manganese activated zinc silicate phosphor 1-7 was prepared in the same manner as the preparation of manganese activated zinc silicate phosphor 1-1, except that Solution B was prepared by using 1415 g of zinc nitrate hexahydrate, 74 g of manganese nitrate hexahydrate and 3.20 g of barium nitrate.

(Preparation of Manganese Activated Zinc Silicate Phosphor 1-8)

Manganese activated zinc silicate phosphor 1-8 was prepared by subjecting manganese activated zinc silicate phosphor 1-7 to a classification treatment by use of a classifier (Elbow-Jet, manufactured by Matsubo Corp.).

(Preparation of Manganese Activated Zinc Silicate Phosphor 1-9)

Manganese activated zinc silicate phosphor 1-9 was prepared in the same manner as the preparation of manganese activated zinc silicate phosphor 1-1, except that Solution B was prepared by using 1460 g of zinc nitrate hexahydrate, 72 g of manganese nitrate hexahydrate and 3.40 g of barium nitrate.

(Preparation of Manganese Activated Zinc Silicate Phosphor 1-10)

Manganese activated zinc silicate phosphor 1-10 was prepared by subjecting manganese activated zinc silicate phosphor 1-9 to a classification treatment by use of a classifier (Elbow-Jet, manufactured by Matsubo Corp.).

Each of prepared manganese activated zinc silicate phosphors 1-1 through 1-10 was subjected to evaluations with respect to composition analysis, particle size distribution, a crystal lattice distortion factor, emission intensity and 1/10 afterglow time.

<Evaluation of Emission Intensity>

Green light was emitted from a phosphor by irradiating vacuum ultraviolet rays by use of an excimer 146 nm lamp (manufactured by Ushio Denki Co., Ltd.) in a vacuum chamber of 0.1-1.5 Pa. Then, the emission intensity of the obtained green light was measured by use of a detector (MCPD-3000, manufactured by Otsuka Electronics Co., Ltd.).

The peak emission intensity of each phosphor was evaluated as a relative value when the emission intensity of manganese activated zinc silicate phosphor 1-1 was set to 100.

<1/10 Afterglow Time>

A fluorescent life time measuring apparatus available on the market was used to measure 1/10 afterglow time. The afterglow time was defined as time until the emission intensity decreased to 1/10 of an emission light intensity, after activation light was stopped, and 1/10 afterglow time was evaluated as a relative value when that of manganese zinc silicate phosphor 1-1 was set to 100.

The obtained results were summarized in table 1.

TABLE 1

| Phosphor (*) No. | Zn | Mn | Ba | Ratio of particles of not larger than 2 μm (%) | Crystal lattice distortion factor (%) | Emission intensity (%) | 1/10 afterglow time | Remarks |
| --- | --- | --- | --- | --- | --- | --- | --- | --- |
| 1-1 | 1.81 | 0.197 | 0.0006 | 36 | 1.35 | 100 | 100 | Comp. |
| 1-2 | 1.94 | 0.020 | 0.0001 | 40 | 0.007 | 112 | 339 | Comp. |
| 1-3 | 1.65 | 0.142 | 0.0025 | 65 | 0.75 | 107 | 91 | Inv. |
| 1-4 | 1.93 | 0.155 | 0.0020 | 57 | 0.53 | 115 | 87 | Inv. |
| 1-5 | 1.81 | 0.062 | 0.0050 | 62 | 0.36 | 122 | 79 | Inv. |
| 1-6 | 1.65 | 0.100 | 0.0010 | 53 | 0.21 | 118 | 72 | Inv. |
| 1-7 | 1.62 | 0.110 | 0.0045 | 63 | 0.09 | 125 | 74 | Inv. |
| 1-8 | 1.61 | 0.113 | 0.0048 | 86 | 0.05 | 128 | 77 | Inv. |

TABLE 1-continued

| Phosphor (*) No. | Zn | Mn | Ba | Ratio of particles of not larger than 2 μm (%) | Crystal lattice distortion factor (%) | Emission intensity (%) | 1/10 afterglow time | Remarks |
|---|---|---|---|---|---|---|---|---|
| 1-9 | 1.75 | 0.080 | 0.0050 | 58 | 0.034 | 112 | 75 | Inv. |
| 1-10 | 1.74 | 0.085 | 0.0054 | 82 | 0.014 | 104 | 76 | Inv. |

Comp.: Comparative example,
Inv.: Inventive example
Phosphor (*): Manganese activated zinc silicate phosphor The following results have been obtained from table 1: Emission intensities of manganese activated zinc silicate phosphors 1-3 through 1-10 of the present invention were 107-125 when emission intensity of manganese activated zinc silicate phosphors 1-1 (comparative example 1) was set to 100. 1/10 afterglow time of manganese activated zinc silicate phosphors 1-3 through 1-10 of the present invention were 91-72 when that of manganese activated zinc silicate phosphors 1-1 (comparative example 1) was set to 100, exhibiting a significant improvement in the both emission intensity and 1/10 afterglow time. Further, manganese activated zinc silicate phosphors 1-2 (comparative example 2) showed improvement of emission intensity, however, showed significant deterioration of 1/10 afterglow time.

Example 2

<Assembling of PDPs (Plasma Display Panels) 2-1 Through 2-10>

PDPs 2-1 through 2-10 were assembled by using phosphor layers containing phosphors of manganese activated zinc silicate phosphors 1-1-1-10 prepared as in example 1, a blue emission phosphor and a red emission phosphor both of which were prepared according to the method described below. White luminances of the assembled PDPs were evaluated.

<Preparation of Red Emission Phosphor and Blue Emission Phosphor>

(1) Preparation of a Red Emission Phosphor [(Y,Gd)BO$_3$:Eu$^{3+}$]

A red emission phosphor precursor was formed by a reaction crystallization method in the presence of a protective colloid. First, gelatin (having a mean molecular weight of approximately 15,000) was dissolved in 300 ml of pure water so as to make the concentration of 5 weight % to prepare Solution A.

Further, 28.99 g of yttrium nitrate hexahydrate, 15.88 g of gadolinium nitrate and 2.60 g of europium nitrate hexahydrate were dissolved in pure water so as to prepare a solution of 150 ml resulting in preparation of Solution B. Further, 8.20 g of boric acid were dissolved in pure water so as to prepare a solution of 150 ml resulting in preparation of Solution C. Next, Solution A was charged in a reaction vessel and was stirred by use of a stirring fan while keeping the temperature at 60° C.

While stirring at 60° C., each of Solution B and Solution C, similarly kept at 60° C., was added to Solution A through a nozzle at a constant rate of 60 ml/min, followed by ripening for 10 minutes. Thereafter, a red emission phosphor precursor was filtered and dried (at 105° C. for 16 hours) to prepare a dried red emission phosphor precursor. Further, a dried red emission phosphor precursor was calcinated under an oxidizing condition at 1200° C. for 2 hours to obtain a red emission phosphor having a mean particle diameter of 0.50° μm.

(2) Manufacturing of a Blue Emission Phosphor (BaMgAl$_{10}$O$_{17}$:Eu$^{2+}$)

In a similar manner to manufacturing of a red emission phosphor, gelatin (having a mean molecular weight of approximately 15,000) was dissolved in 300 ml of pure water so as to make the concentration of 5 weight % to prepare Solution A. Further, 5.80 g of barium nitrate, 0.89 g of europium nitrate hexahydrate and 5.13 g of magnesium nitrate hexahydrate were dissolved in 295.22 ml of pure water to prepare Solution B. Further, 85.03 g of aluminum nitrate nonahydrate were dissolved in 268.85 ml of pure water to prepare Solution C.

A blue emission phosphor precursor was formed from Solution A, Solution B and Solution C having been prepared in the above manner by a reaction crystallization method similar to the method shown in manufacturing of a red emission phosphor described above, and the precursor was subjected to for example a calcination process resulting in preparation of a blue emission phosphor having a mean particle diameter of 0.52 μμm.

<Preparation of Phosphor Paste>

Each phosphor paste was prepared by utilizing manganese activated zinc silicate phosphors 1-1 through 1-10 prepared in example 1, and a red emission phosphor and a blue emission phosphor which were prepared in above (1) and (2). At the preparation, each phosphor was mixed with ethyl cellulose, polyoxyethylene alkyl ether and 1:1 mixed solution of triphenol and pentanediol, so as to make a solid concentration of each phosphor of 50 weight %.

Obtained each mixture was designated as manganese activated zinc silicate phosphor paste 1-1-1-10, a red emission phosphor paste and a blue emission phosphor paste, respectively.

(Assembling of PDP 2-1)

PDP 2-1 having a structure shown in FIG. 2 was assembled as described below by utilizing phosphor paste 1-1, a red phosphor paste and a blue phosphor paste, which have been prepared above.

First, transparent electrodes 11a were provided on a glass substrate to be front surface plate 10. Next, bus electrodes 11b were formed on transparent electrodes 11a by sputtering Cr—Cu—Cr followed by photo-etching, to form display electrodes 11. Then, low melting point glass was printed so as to cover display electrodes 11 on aforesaid front glass substrate 10 and the resulting product was burned at 500-600° C., resulting in formation of dielectric substance layer 12. Further, MgO was evaporated by means of an electron beam on dielectric substance layer 12 to form protective layer 13.

An Ag thick layer was printed on back surface plate 20 which was then subjected to photo-etching followed by burning. Thus, address electrodes 21 were obtained. Separating walls 30 were formed at the both sides of address each electrode 21 on the back surface plate 20. Separating walls 30 were formed by printing low melting point glass at a 0.2 mm pitch, followed by burning. Further, phosphor paste 1-1, a red emission phosphor paste and a blue emission phosphor paste were coated on or filled in bottom planes 31a and side planes 30a of discharge cells 31 which were divided by separating walls 30.

At this time, a phosphor paste of one color for each discharge cell 31 was utilized. Thereafter, phosphor layers 35R, 35G and 35B, each of which had a different emission color, at discharge cells 31R, 31G and 31B, were formed by burning or drying a phosphor paste to eliminate-organic components in the paste.

Then, aforesaid front surface plate 10 and back surface plate 20 were positioned, so that each electrode printed surface faced to each other, and sealed at their circumferences with sealing glass (being not shown in the drawing) keeping a gap of approximately 1 mm. Successively, a gas, in which xenon (Xe) which generates ultraviolet rays by discharge and neon (Ne) as a primary discharge gas were mixed, was introduced and sealed between aforesaid substrates 10 and 20. The product was subjected to aging and PDP 2-1 was obtained.

(Assembling of PDP 2-2)

PDP 2-2 was assembled in the same manner as the assembling of PDP 2-1 except that phosphor paste 1-2 prepared as above was utilized instead of phosphor paste 1-1.

(Assembling of PDP 2-3)

PDP 2-1 was assembled in the same manner as the assembling of PDP 2-1 except that phosphor paste 1-3 prepared as above was utilized instead of phosphor paste 1-1.

(Assembling of PDP 2-4)

PDP 2-4 was assembled in the same manner as the assembling of PDP 2-1 except that phosphor paste 1-4 prepared as above was utilized instead of phosphor paste 1-1.

(Assembling of PDP 2-5)

PDP 2-5 was assembled in the same manner as the assembling of PDP 2-1 except that phosphor paste 1-5 prepared as above was utilized instead of phosphor paste 1-1.

(Assembling of PDP 2-6)

PDP 2-6 was assembled in the same manner as the assembling of PDP 2-1 except that phosphor paste 1-6 prepared as above was utilized instead of phosphor paste 1-1.

(Assembling of PDP 2-7)

PDP 2-7 was assembled in the same manner as the assembling of PDP 2-1 except that phosphor paste 1-7 prepared as above was utilized instead of phosphor paste 1-1.

(Assembling of PDP 2-8)

PDP 2-8 was assembled in the same manner as the assembling of PDP 2-1 except that phosphor paste 1-8 prepared as above was utilized instead of phosphor paste 1-1.

(Assembling of PDP 2-9)

PDP 2-9 was assembled in the same manner as the assembling of PDP 2-1 except that phosphor paste 1-9 prepared as above was utilized instead of phosphor paste 1-1.

(Assembling of PDP 2-10)

PDP 2-10 was assembled in the same manner as the assembling of PDP 2-1 except that phosphor paste 1-10 prepared as above was utilized instead of phosphor paste 1-1.

Each of obtained PDPs (plasma display panels) was evaluated as follows with respect to each of emission intensity and a luminance maintenance rate.

<Emission Intensity>

White luminance was measured while a common maintaining voltage (an alternate current voltage of 180 V) was applied on the electrodes of each of PDPs 2-1 through 2-10 assembled as above. White luminance for each of PDP-2 through PDP-10 was expressed as a relative value, when white luminance of PDP 2-1 was set to 100.

<Luminance Maintenance Rate>

An input electric power of each color was adjusted to give an initial color temperature of 11000 K for each of PDP 2-1 through 2-10 assembled above. And variation of the emission luminance due to continuous drive was examined. The luminance after 1000 hours drive was expressed as a relative value when the initial luminance was set to 100.

TABLE 2

| PDP No. | Ratio of particles of not larger than 2 μm (%) | White luminance (%) | Luminance maintenance ratio (%) | Remarks |
|---|---|---|---|---|
| 2-1 | 36 | 100 | 75 | Comparison |
| 2-2 | 40 | 106 | 79 | Comparison |
| 2-3 | 65 | 104 | 91 | Invention |
| 2-4 | 57 | 104 | 93 | Invention |
| 2-5 | 62 | 105 | 92 | Invention |
| 2-6 | 53 | 107 | 95 | Invention |
| 2-7 | 63 | 106 | 94 | Invention |
| 2-8 | 86 | 111 | 97 | Invention |
| 2-9 | 58 | 107 | 94 | Invention |
| 2-10 | 82 | 112 | 98 | Invention |

From table 2, initial luminance of each of PDP 2-3 through 2-10 was in the range of 104 to 112 when initial luminance of PDP 2-1 (comparative example 1) was set to 100. The improved luminance observed for each of PDPs 2-8 and 2-10 was assumed to be due to a higher content of particles having a diameter of not more than 2 μm. With respect to a luminance maintenance rate, that of PDP 2-1 (comparative example 2) was 75 while those for PDPs 2-1 through 2-10 of the present invention were 91-98, exhibiting depressed deterioration of luminance while driving the PDPs. Thus, a significant improvement in life time of a PDP was attained.

The present invention provided a manganese activated zinc silicate phosphor which exhibited high emission intensity and depressed afterglow time and a PDP utilizing the same which exhibited high white luminance and a high luminance maintaining ratio.

What is claimed is:

1. A manganese activated zinc silicate phosphor comprising phosphor particles having a crystal lattice distortion factor of 0.01 to 1.0%.

2. The manganese activated zinc silicate phosphor of claim 1, wherein the phosphor particles have a crystal lattice distortion factor of 0.02 to 1.0%.

3. The manganese activated zinc silicate phosphor of claim 1, wherein the phosphor particles have a crystal lattice distortion factor of 0.02 to 0.6%.

4. The manganese activated zinc silicate phosphor of claim 1, wherein the phosphor particles have a crystal lattice distortion factor of 0.04 to 0.6%.

5. The manganese activated zinc silicate phosphor of claim 1, wherein
a content of manganese in the phosphor particles is 2 to 9% by mole based on the total mole of zinc contained in the phosphor particles; and
the phosphor particles further contain barium and a molar ratio of Ba/Mn in the phosphor particles is 0.005 to 0.2.

6. The manganese activated zinc silicate phosphor of claim 1, wherein
a content of manganese in the phosphor particles is 4 to 8% by mole based on the total mole of zinc contained in the phosphor particles; and
the phosphor particles further contain barium and a molar ratio of Ba/Mn in the phosphor particles is 0.02 to 0.1.

7. The manganese activated zinc silicate phosphor of claim 1, wherein a number of the phosphor particle having a particle diameter of not more than 2 μm is not less than 70% of the total number of phosphor particles.

8. A plasma display panel having a phosphor layer containing the manganese activated zinc silicate phosphor of claim 1.

* * * * *